No. 860,845.

PATENTED JULY 23, 1907.

G. A. BARNES.
BOX MACHINE.
APPLICATION FILED SEPT. 6, 1900.

6 SHEETS—SHEET 1.

Witnesses:
Jas. E. Hutchinson.
Henry C. Hazard.

Inventor.
George A. Barnes, by
Prindle and Russell his Attys

No. 860,845.  
PATENTED JULY 23, 1907.  
G. A. BARNES.  
BOX MACHINE.  
APPLICATION FILED SEPT. 6, 1900.  
6 SHEETS—SHEET 5.

Witnesses:  
Jas. E. Hutchinson.  
Henry C. Hazard.

Inventor  
George A. Barnes, by  
Prindle and Russell, his Attys.

No. 860,845. PATENTED JULY 23, 1907.
G. A. BARNES.
BOX MACHINE.
APPLICATION FILED SEPT. 6, 1900.
6 SHEETS—SHEET 6.
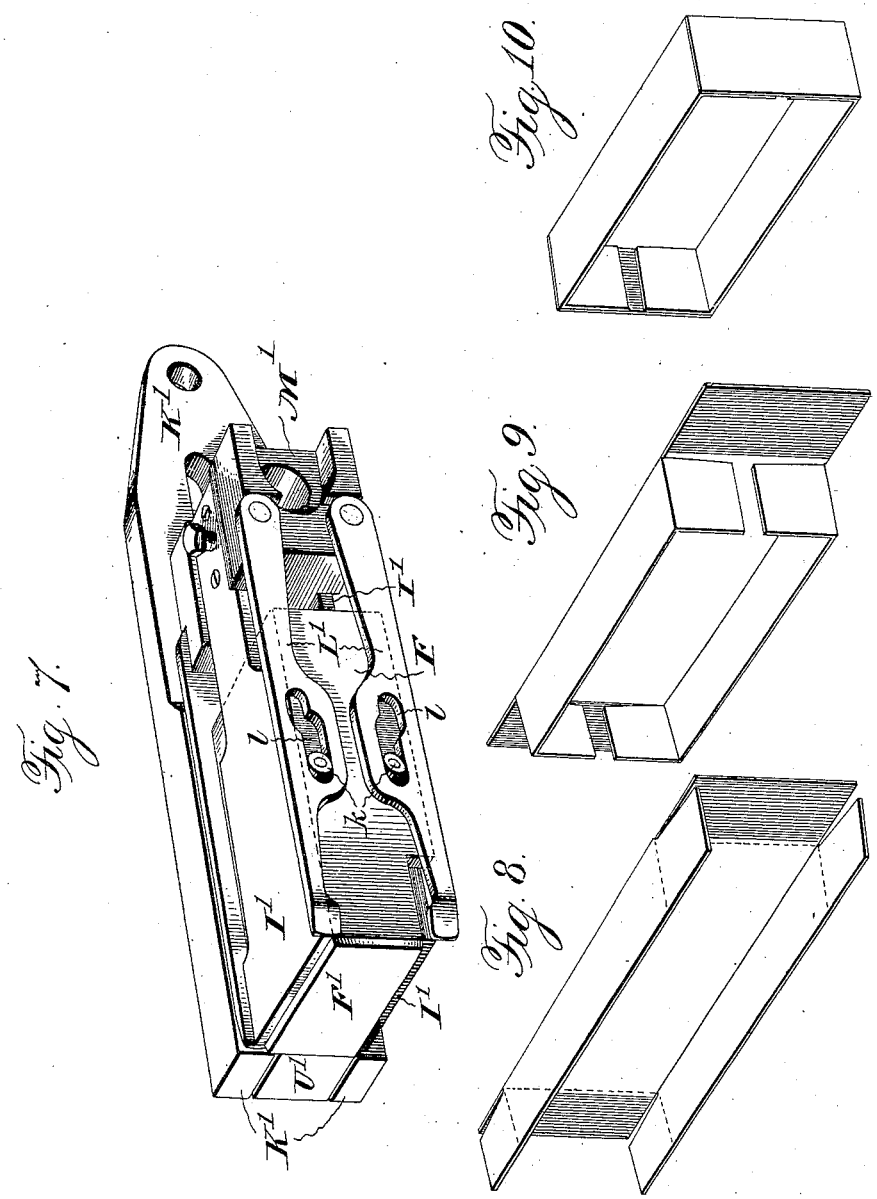
Witnesses:
Jas E Hutchinson.
Henry C. Hazard.
Inventor.
George A. Barnes, by
Prindle and Russell, his Atty.

UNITED STATES PATENT OFFICE.

GEORGE A. BARNES, OF NEW HAVEN, CONNECTICUT, ASSIGNOR TO THE DIAMOND MATCH COMPANY, OF CHICAGO, ILLINOIS, A CORPORATION OF ILLINOIS.

BOX-MACHINE.

No. 860,845.  Specification of Letters Patent.  Patented July 23, 1907.

Application filed September 6, 1900. Serial No. 29,225.

*To all whom it may concern:*

Be it known that I, GEORGE A. BARNES, of New Haven, in the county of New Haven and in the State of Connecticut, have invented certain new and useful Improvements in Box-Machines; and I do hereby declare that the following is a full, clear, and exact description thereof, reference being had to the accompanying drawings, in which—

Figure 1:
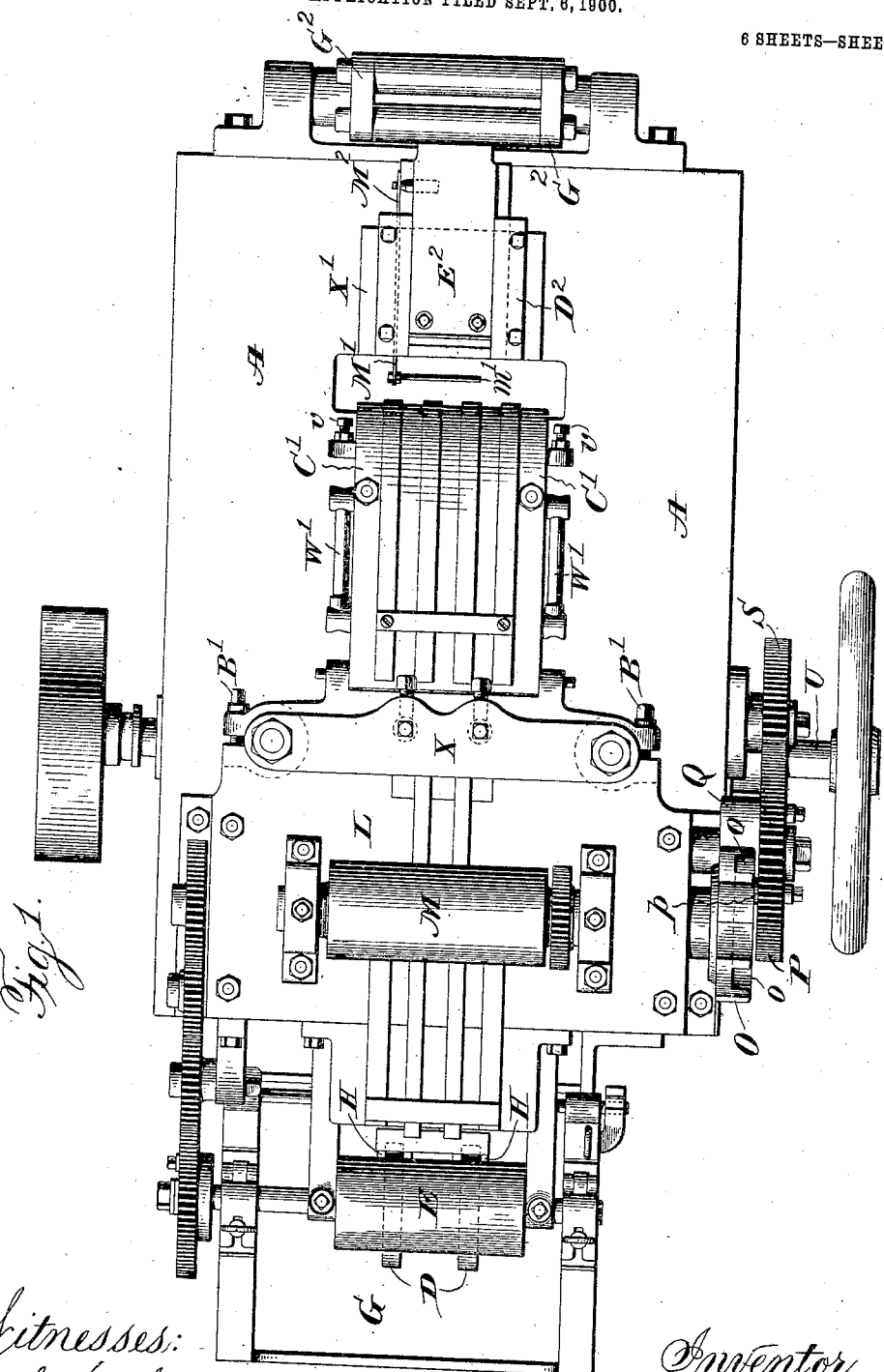
Figure 2:
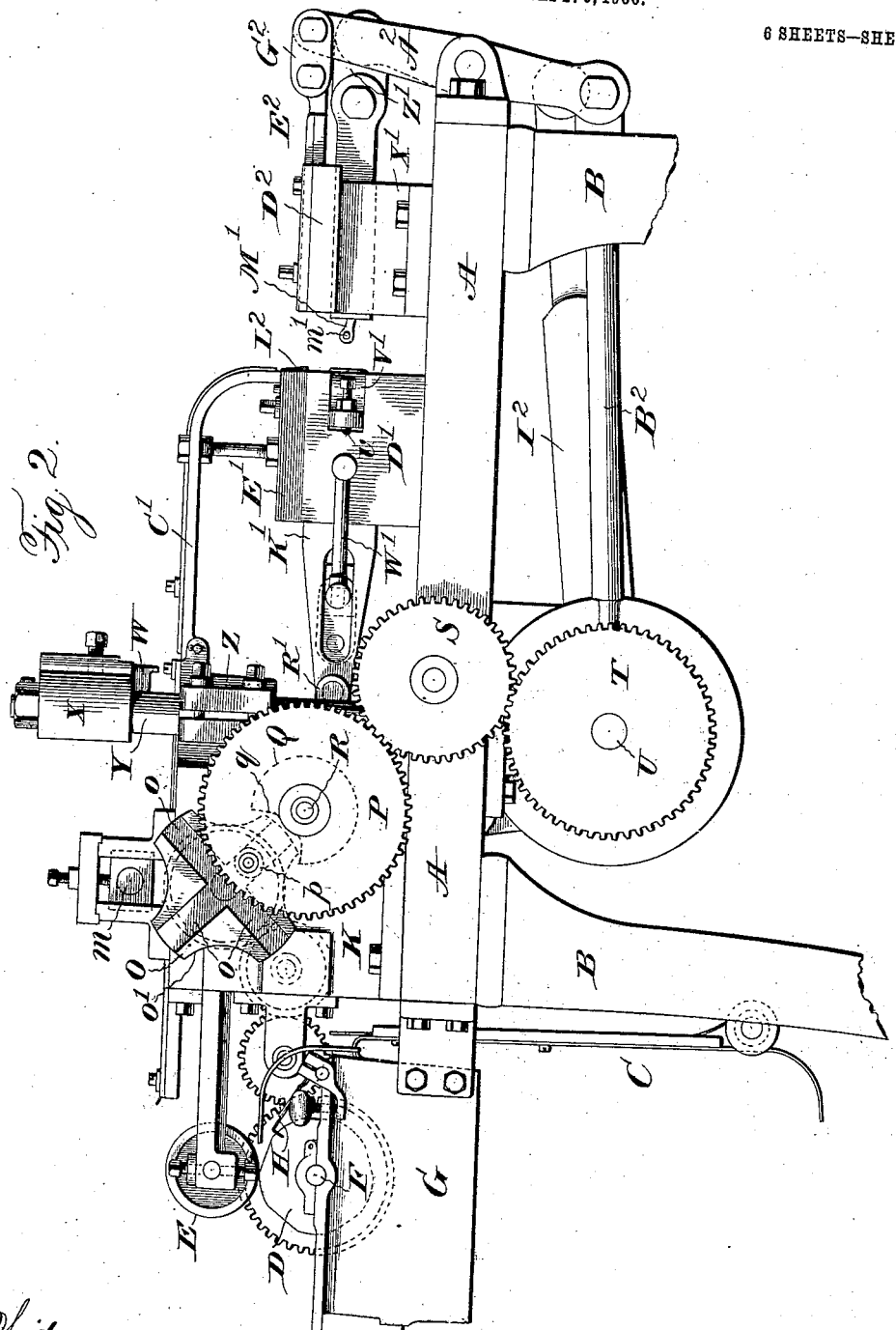
Figure 3:
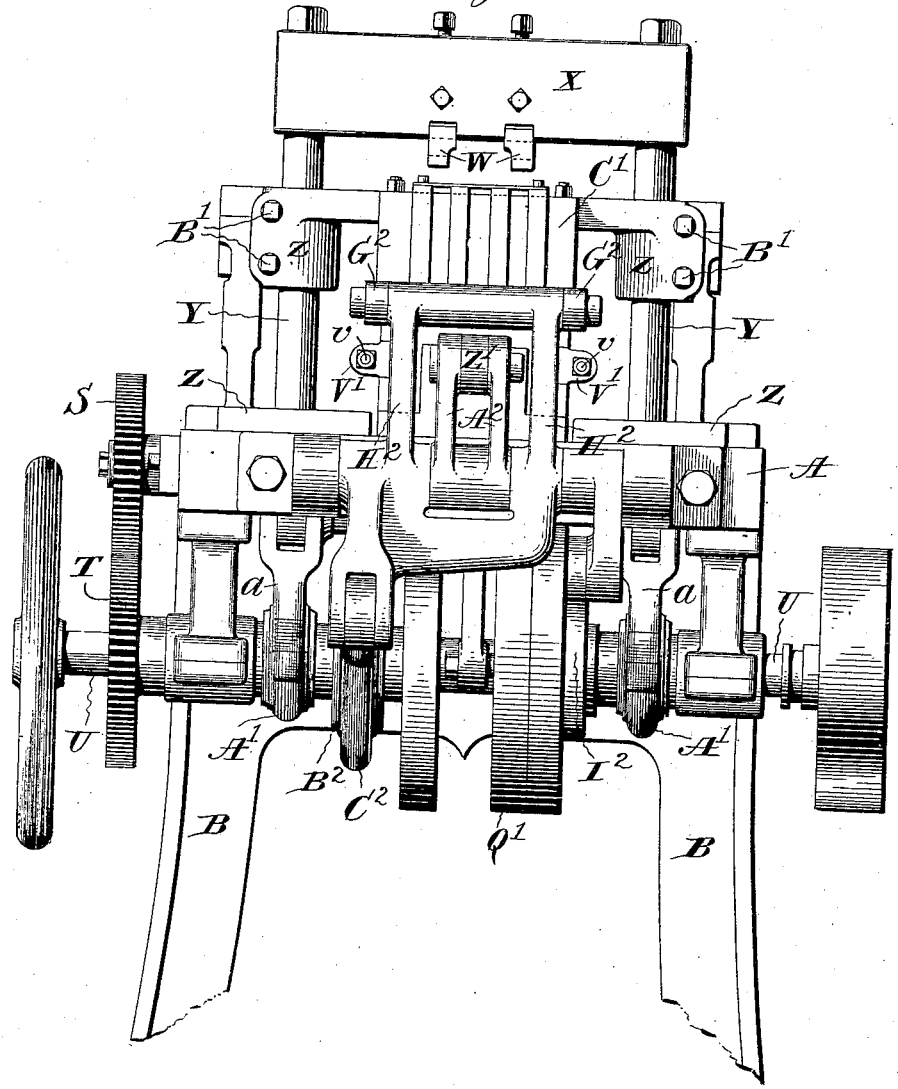
Figure 4:
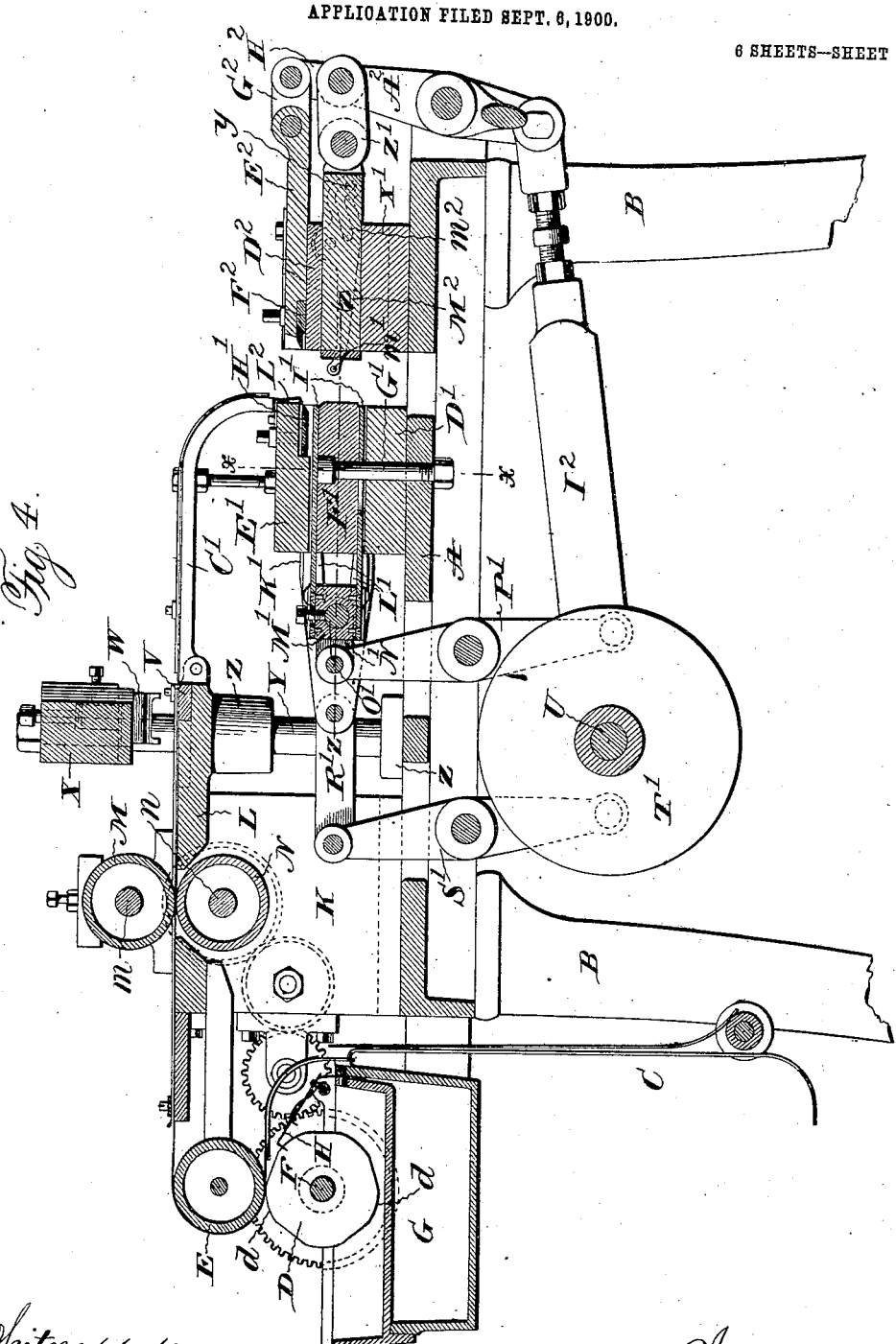
Figure 5:
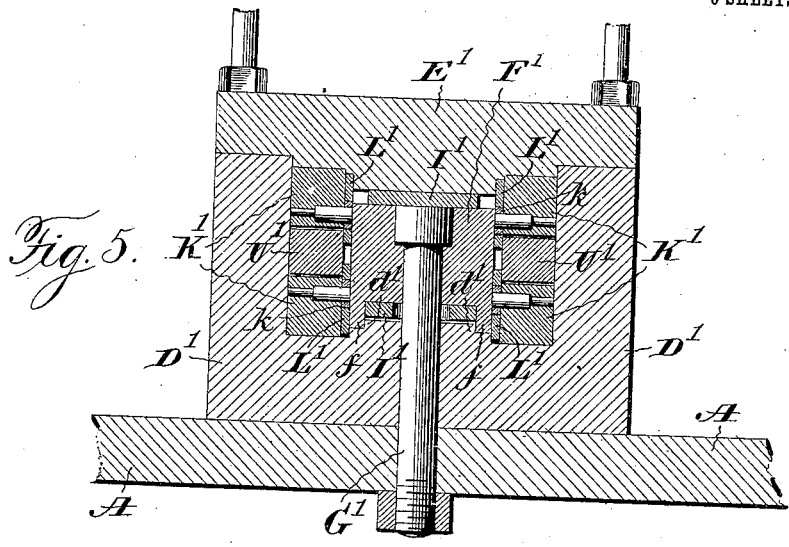
Figure 6:
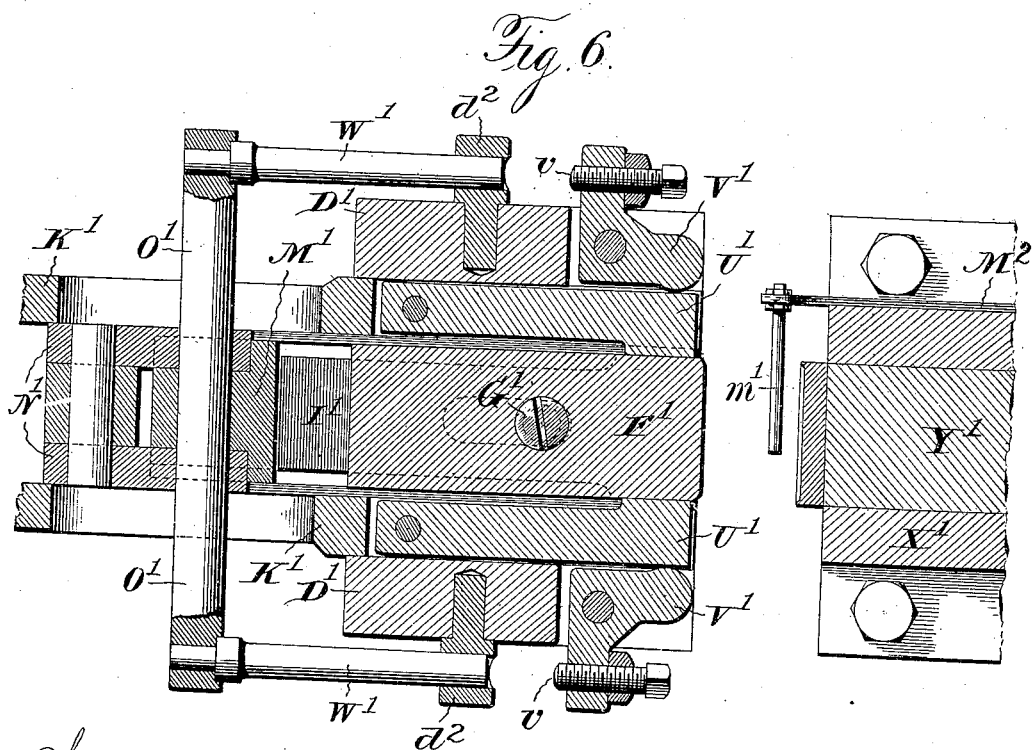

Figure 1 is a top plan view of a paper box machine embodying my invention; Fig. 2 is a side elevation thereof; Fig. 3 an end elevation; Fig. 4 a vertical, longitudinal section; Fig. 5 a vertical cross section on the line $x$—$x$ of Fig. 4; Fig. 6 a detail view in horizontal section on the line $z$—$z$ of Fig. 4; Fig. 7 a detail view in perspective of the folder mechanism, one of the box-end folders being omitted; Figs. 8, 9 and 10 are, respectively, views of the box when only the side folds have been made, the sides and corner folds, and when it is finished.

Letters of like name and kind refer to like parts in each of the figures.

The object of my invention is to provide an improved box making machine, my object more particularly being to improve the construction of machine shown in Patent No. 640,171, granted to me January 2d, 1900, and to this end, my invention,—consists in the box machine having the features of construction substantially as hereinafter specified.

The class of machine to which my invention relates is one in which the material,—usually paper—of which the boxes are made is supplied from a roll, being drawn therefrom by an intermittent motion or feed, has glue applied to it at appropriate points, is notched or nicked on both sides, is severed a sufficient distance from its forward end to form a blank for a box, and the blank, thus completed, is acted upon by forming devices to produce the finished box.

In its general arrangement and in the construction of some of the details, the present machine is similar to the one illustrated in the aforesaid patent. As in the latter there is a bed A on legs B and B, and at one end a vertical guide C for the paper coming from the roll or source of supply, from the upper end of which guide the paper is carried between glue-applying wheels D and D and a roller E. The glue-applying wheels are mounted on a shaft F that has bearings on the opposite sides of the glue-pot G into which the lower portions of the wheels dip, and for each wheel there is a scraper H, similar to the scraper of said patent. The glue-wheel periphery is formed into a series of pads $d$ and $d$, as in the former case, but instead of the rounded form of sloping surfaces at their ends, as in such case, said surfaces are plane or straight, the sections of periphery between pads being flattened. The flattening does not produce an abrupt formation that causes the presence of pockets, and hence the scraper H can have uninterrupted contact with the wheel to remove all excess of glue so as to leave only the desired quantity on the pads.

Rising from the bed A are two standards K and K by which is supported a table or platform L over which the paper is passed from the roller E, and respectively above and below the table L are two feed rolls M and N, whose shafts $m$ and $n$ are mounted in bearings on the standards. The feed rolls are revolved intermittently, and because of this it has been found desirable to have the beginning and ending of their movement slower than the remainder. Such variation in the motion of the feed rolls obviates the shock or jar caused by sudden and quick starting and stopping, and, in respect to slow starting, is also desirable in that it avoids subjecting the paper to undue strain, while in respect to slow stopping it enables the easy and certain arrest of the paper so as to insure that no more than the precise amount desired shall be fed. As a simple and efficient means for securing such variable movement of the feed rolls, I prefer to use a trammel or radially slotted wheel O on the lower roll shaft $n$, and a stud or roller $p$ on a gear wheel P, which stud coöperates with the trammel wheel slots or grooves $o$ and $o$, and, as will be readily perceived, by reason of the varying distance from the center of the wheel of its point of engagement with the walls of the slots, causes a variation in the rate of revolution of the roll. Starting to rotate the roll by engaging a slot wall at the outer end thereof, the stud causes the roll to move slowly, and as it approaches the axis thereof, it accelerates its motion, and finally, returning to the outer end of the slot causes its motion gradually to diminish, until passing out of engagement with the slot, the revolution of the wheel ceases, to be resumed, when, by the continued turning of the wheel P, the stud is engaged with the next following slot $o$. The roll is positively locked the instant of cessation of its motion to prevent overthrow or overfeed of the paper from the momentum of parts, and for this purpose I employ the Geneva stop, the periphery of the trammel wheel being provided with concave notches $o'$ and $o'$, and a disk Q to coöperate therewith, and having a notch $q$, being secured to the inner side of the gear wheel P. The latter is mounted on a stud shaft R that is fastened to the near standard K.

Meshing with the gear wheel P, is an idler gear wheel S that is in mesh with and receives motion from a gear wheel T on the main driving shaft U, supported in bearings below the bed A. Power to rotate the glue wheel shaft is taken, as in the machine of the patent referred to, from the lower roll shaft $n$ by a train of gearing, which need not be described.

Leaving the feed rolls, the paper passes to the nick cutters, which comprise a die V in the table L, and punches W and W carried by a vertically movable cross-head X. The latter is secured at opposite ends to the upper ends of two round rods Y and Y, which, respectively, pass through a pair of guides Z and Z on the table L and the bed A. At their lower ends, beneath the bed A, each rod is pivotally connected to the strap $a$ of an eccentric A' on the main shaft U. Each of the guides in the table L is split radially and bolts B' and B' cross the split, so that adjustment to compensate for wear may be had. From the punches, the paper passes over an extension C' of the table L that extends horizontally and then curves downwardly, and leaving the latter, its forward end is presented in position for the action of the cutting-off and the folder mechanisms, which will be next described.

Upon the bed A and bolted thereto is a block D' comprising integral bottom and two sides, and a separate top or cap E' that is fastened to the two sides by screws, and centrally disposed within the space inclosed by the block D' is a block F' against whose outer vertical end or face is held that portion of the cut-off blank which forms the box bottom. The block F' is secured by means of a bolt G' whose head is countersunk in its upper side and whose shank passes downward through it, through the block D' and through the bed A, where beneath the latter it has a nut. On opposite sides, for about two-thirds its length from the rear end, are two ribs or flanges $f$ and $f$ that rest on the bottom of the block D' and engage the opposite sides of a raised portion $d'$ of said bottom which projects between them, and coöperating with them aids in rigidly holding the block F'. The flanges $f'$ and the raised portion $d'$ therebetween form guides for the block F' that restrain it from any tendency to a lateral or sidewise movement. Secured to the underside of the cap E', in the space above the block F', is a stationary knife H', and in the spaces above and below the block F' are two reciprocating plates I' and I', that constitute the two side folders, while in the spaces on the sides of the block F' are two reciprocating bars K' and K' that form the end folders and four pivoted blades L' and L' which constitute the corner folders. The rear ends of the side folders are fixed to the top and bottom, respectively, of a head M', and to the opposite sides of said head the rear ends of the corner folders are pivoted, so that they may swing vertically.

Links N' and N', pivoted to the head M' by a horizontal bolt O', connect the head to the upper end of a lever P' that is pivoted to the bed A and has its lower end in engagement with a cam Q' on the main driving shaft. The rear ends of the side folders are connected by links R' with the upper end of another lever S' which is pivoted to the bed A, and has its lower end in engagement with a cam T' on the main driving shaft. As there is relative longitudinal movement of the end folders and the corner folders, such is utilized to effect the vertical swing of the latter, and for this purpose each corner folder has a cam slot $l$ into which projects a pin or stud $k$ from the contiguous end folder.

Pivoted at its rear end in a horizontal slot in the forward part of each end folder is a bar U', and pivoted in a similar slot in the forward end of each side piece of the block D' is a bell-crank lever V', one end of which is contiguous to the adjacent bar U', while its other end projects beyond the outer face of the block side, in line with and adapted to be engaged by the forward end of a horizontal bar W' which is attached at its rear end to a lateral prolongation of the pivot bolt O' so that said bar moves with the head M'. The bar is guided by a lug or projection $d^2$ on the side of the block that has an opening through which the rod passes. The end folders are provided each with a longitudinal slot for the accommodation of the prolongation of the bolt O'. Preferably the levers V' and V' have adjustable bearing surfaces for their respective rods W' and W', which, as shown, are screws or bolts $v$ and $v$.

Slidingly mounted in a guide block X' on the bed A is a former plunger Y', which is moved to and from position to coöperate with the block F' and the folders, and is so moved horizontally by being connected at one end by a link Z' with the upper end of a lever $A^2$ that is pivoted to the bed A, whose lower end is connected to one end of a pitman $B^2$, the other end of which is in engagement with an eccentric $C^2$ on the main driving shaft.

Over, and secured to the block X' is a plate $D^2$ having in its upper side a guide-way for a reciprocating head $E^2$ to which is attached a knife $F^2$ in position to coact with the stationary knife H'. The head $E^2$ is connected by a link $G^2$ to the upper end of a lever $H^2$ pivoted to the bed A, the lower end of which is connected by a pitman $I^2$ to the strap of an eccentric $K^2$ on the main driving shaft. To prevent the forward end of the paper, when the blank is severed, from catching on the stationary knife, an elastic plate $L^2$ is placed immediately above said knife, its lower, free edge standing normally off from the end of the cap E' and being pressed back upon said knife by the engagement therewith of the advancing movable knife $F^2$, and when freed from the latter, resuming its normal position, and carrying the free end of the paper off the stationary knife. The plate $L^2$ is secured in place by having a horizontal extension at its upper edge that lies upon and is screwed to the top of the cap E'.

Pivoted intermediate its ends to one side of the guide block X' is a thin bar $M^2$, one of whose ends is projected alongside the space between the block D' and X', and has extending into such space a rod or arm $m'$. For swinging the bar to move its rod or arm up and down, the bar has a cam slot $m^2$ into which projects a stud, or pin $y$ on the plunger Y', so that when the latter is advanced the rod will be raised, and when it is retracted, the rod will be depressed, and with such swiftness as to administer a smart enough blow to the completed box when the plunger withdraws therefrom, as to promptly expel it from the machine.

The operation of the cutting and folding mechanisms is as follows:—The paper feeding rolls having fed enough paper to form a box blank into position, the knife $F^2$ and the former plunger are advanced, the said knife coacting with the stationary knife to cut the paper, and the former plunger pressing against the block F' that portion of the blank which forms the box bottom. The two side folders, now advancing, fold down upon the upper and lower sides of the plunger the two box sides, during which time the two end folders remain stationary. As the four corner folders are attached to the same head as the side folders, the corner folders accordingly advance with the side folders, and their cam slots engaging with the pins or studs on the now stationary end folders, the corner folders are swung into contact with the corner flaps after the side folders have done their work, and turn said corner flaps over against the opposite sides of the plunger. The end folders being now advanced, engage the end flaps of the blank and when they have turned them far enough for them to confine the previously folded corner flaps, the pins or studs of the end folders engaging the cam slots of the corner folders, swing the latter upward out of the way and then complete the work of turning the ends against the corner flaps on the sides of the plunger. It will be perceived that the swinging movement of the corner folders is caused wholly by the cam slots and pins or studs. The travel of the side and corner folders head being slightly prolonged after the completion of the work of the end folders, the rods W' and W' encounter the bell-crank levers V' and V', and the latter acting on the supplemental pressure bars U' and U' apply, through the latter extra sidewise pressure upon the glued, overlapped parts and thereby is insured their thorough adhesion and setting. The folders and knife and plunger being duly retracted, and the finished box stripped from the plunger, by contact with the plunger guide, it is expelled from the machine by a stroke from the ejector-rod $m'$.

Having thus described my invention, what I claim is—

1. The combination with a former, of successively-acting folders whereby a portion of material is imposed upon another, a supplemental pressure bar carried by one of said folders, and means for moving said bar toward the former after the said portions have been folded.

2. The combination with a former, of successively-acting folders whereby one portion of material is imposed upon another, a supplemental bar pivoted to one of said folders, a lever to move said bar, and means for operating the lever.

3. The combination with a former, of successively-acting folding devices including movable folders whereby the outer flaps are imposed upon those beneath, supplemental pressure bars pivoted in slots in said movable folders, levers having their pivot supports stationary relative to the folders, and means for operating said levers.

4. The combination with a former, of successively-acting folding devices including movable folders whereby the outer flaps are imposed upon those beneath, bars carried by said movable folders, levers that engage said bars, actuating mechanism for said folders, and rods carried by said mechanism to operate the lever.

5. The combination of a former, a bottom block, folders placed around the block, a guide block for said folders, pressure devices carried by some of the folders, levers pivoted to the guide-block, a head to which the other folders are attached, and rods to engage the levers, connected with said heads, substantially as described.

6. The combination of a former, a bottom block, a block inclosing the latter, ledges on the bottom block between which is a projection from the inclosing block, and folders in spaces between the two blocks, substantially as described.

7. The combination of a bottom block and a plunger, means for reciprocating said plunger endwise toward and from said block, longitudinally movable folders on said block, and means for actuating said folders in respect to the plunger to effect the formation of the sides and ends of the box, means to strip the box from the plunger during the retraction of the latter from the block, and a box-ejecting device including a member movable crosswise of the direction of movement of the plunger and within the space between the block and plunger, and operative connections between the said device and the plunger, whereby the plunger in its back stroke, when the box has been stripped therefrom and the folders longitudinally retracted, actuates the said member to cause it to engage and eject the finished box.

8. The combination of a bottom block and a plunger, means for reciprocating said plunger endwise toward and from said block, longitudinally-movable folders on said block, and means for actuating said folders in respect to the plunger to effect the formation of the sides and ends of the box, means to strip the box from the plunger during the retraction of the latter from the block, a movable bar adjacent said plunger having an ejector arm thereon, and connections between the bar and the plunger whereby said arm is actuated by the latter to swing within the space between the block and plunger, and crosswise of the direction of movement of the plunger, when the box has been stripped from the plunger and the folders longitudinally retracted.

9. The combination of a bottom block and a plunger, means for reciprocating said plunger endwise toward and from said block, longitudinally-movable folders on said block, means for reciprocating said folders in respect to the plunger to effect the formation of the sides and ends of the box, a guide for said plunger to engage the box and strip it from the plunger when the plunger is being retracted from the block, a bar pivoted to the said guide laterally of the plunger, an ejector arm on one end of said bar extending in front of the said guide, and connections between said bar and plunger whereby, when the box has been stripped from the plunger and the folders longitudinally retracted, the said bar with its arm is vibrated within the space between the plunger and the block and crosswise of the direction of movement of the plunger.

10. The combination with a bottom block and a plunger, means for reciprocating said plunger endwise toward and from said block, longitudinally-movable folders in said block, means for actuating said folders in respect to the plunger so as to effect the formation of the sides and ends of the box, a guide for the plunger which engages the box and strips it from the plunger when the plunger is retracted, a pivoted bar laterally of the plunger, extending in front of the guide and movable in a direction crosswise of the plunger when the bar is vibrated, and a cam slot and pin connection between the bar and plunger, whereby during the movement of the latter, when the box has been stripped from the plunger and the folders longitudinally retracted, the bar is vibrated to engage and eject the said box.

In testimony that I claim the foregoing I have hereunto set my hand this 13th day of August, A. D. 1900.

GEORGE A. BARNES.

Witnesses:
GEORGE E. HALL,
WALLACE S. MOYLE.